United States Patent
Koyamada et al.

[11] Patent Number: 5,956,041
[45] Date of Patent: Sep. 21, 1999

[54] METHOD AND DEVICE FOR VOLUME RENDERING USING CONCENTRIC SPHERICAL SLICING ISOSURFACES

[75] Inventors: Koji Koyamada, Hadano; Sakae Uno, Hachioji; Tatsuo Miyazawa, Tokyo, all of Japan

[73] Assignee: International Business Machines Corporation, Armonk, N.Y.

[21] Appl. No.: 07/991,019

[22] Filed: Dec. 15, 1992

[30] Foreign Application Priority Data

Jan. 29, 1992 [JP] Japan .................................. 4-013841

[51] Int. Cl.⁶ .................................................. G06T 17/20
[52] U.S. Cl. .................................................. 345/420
[58] Field of Search .................... 395/120, 123, 395/124, 127, 131; 345/420, 423, 424, 427, 431

[56] References Cited

U.S. PATENT DOCUMENTS

| | | | |
|---|---|---|---|
| 4,019,034 | 4/1977 | Blom et al. ............................ 364/564 |
| 4,797,842 | 1/1989 | Nackman et al. ................... 345/420 X |
| 4,893,260 | 1/1990 | Arakowa .............................. 345/420 X |
| 4,918,625 | 4/1990 | Yan ....................................... 345/431 |
| 4,941,114 | 7/1990 | Shigyo et al. ....................... 345/423 X |
| 4,992,962 | 2/1991 | Ishida et al. ........................ 345/423 X |
| 5,019,903 | 5/1991 | Dougall et al. ........................... 348/448 |
| 5,113,357 | 5/1992 | Johnson et al. .......................... 345/424 |
| 5,113,490 | 5/1992 | Winget .................................... 345/419 |
| 5,150,457 | 9/1992 | Behm et al. ............................. 345/420 |
| 5,163,127 | 11/1992 | Ikumi et al. ........................ 345/420 X |
| 5,173,947 | 12/1992 | Chande et al. ..................... 345/424 X |
| 5,222,202 | 6/1993 | Koyamada .............................. 345/423 |
| 5,222,204 | 6/1993 | Swanson ................................. 345/427 |
| 5,283,859 | 2/1994 | Quarendon et al. .................... 345/427 |
| 5,317,681 | 5/1994 | Glassner ................................. 345/441 |
| 5,361,385 | 11/1994 | Bakalash ................................ 345/424 |

OTHER PUBLICATIONS

Foley et al, Computer Graphics Principles and Practice, 1990, Plate I.1, pp. 1034 to 1039.

*Primary Examiner*—Anton Fetting
*Attorney, Agent, or Firm*—Mark S. Walker; Kelley K. Kordzik; George E Clark

[57] ABSTRACT

A rendering method is provided that can materialize rendering processing from volume data at high speed using a surface rendering processor without restrictions on the structure of volume data to be processed. In the method, the sampling points of volume data V over a 3-D region are, in principle, arranged on the surfaces $Q_1, Q_2, \ldots Q_n$ in equal intervals along a viewing ray L around viewing point p, and these surfaces are extracted as a set of triangles $T_i$. Then, the volume data at each vertex of these triangles and the gradient vectors of this data are obtained by interpolation and generated as a triangle data group. High-speed volume rendering is materialized by displaying the data groups of these partially transparent triangles using a surface rendering processor. Since existing programs can be used for generation and processing of triangle data groups, there are no restrictions on the structure of the volume data to be handled.

14 Claims, 14 Drawing Sheets

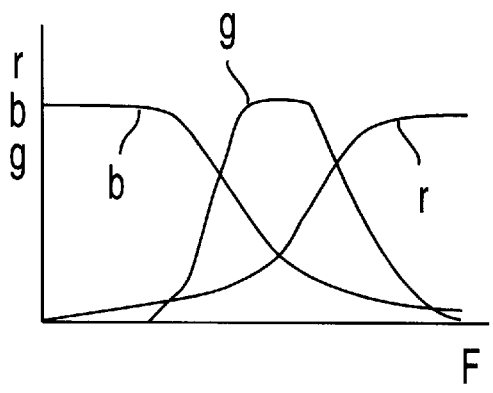 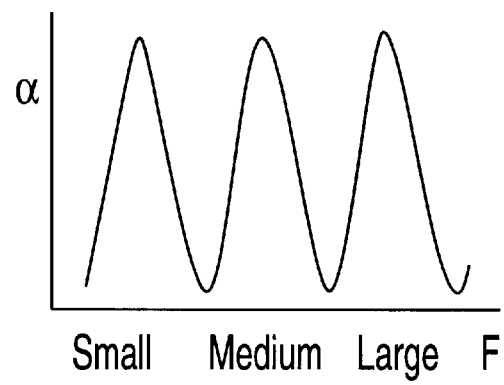
FIG. 11A  FIG. 11B
|   | X | Y | Z | R | G | B | α |
|---|---|---|---|---|---|---|---|
|   |   |   |   |   |   |   |   |
| i | Xi | Yi | Zi | CiR | CiG, | CiB |   |
|   |   |   |   |   |   |   |   |
|   |   |   |   |   |   |   |   |
| j | Xj | Yj | Zj | CiR | CiG, | CjB |   |
|   |   |   |   |   |   |   |   |
|   |   |   |   |   |   |   |   |
|   |   |   |   |   |   |   |   |
| k | Xk | Yk | Zk | CkR | CkG, | CkB |   |
|   |   |   |   |   |   |   |   |
|   |   |   |   |   |   |   |   |
FIG. 12

| Method | Unevenness | Differences in color |
|--------|------------|----------------------|
| A | Some | Some |
| B | None | Some |
| C | None | None |
| D | None | None |

METHOD AND DEVICE FOR VOLUME RENDERING USING CONCENTRIC SPHERICAL SLICING ISOSURFACES

BACKGROUND OF THE INVENTION

1. Field of the invention

The present invention is related to volume rendering, which plays a very important role in the visualization of scalar data (volume data) defined over a three-dimensional (3-D) region.

2. Description of the Related Art

In volume rendering, a density cloud is displayed from volume data, and the appearance of the cloud can be easily modified by specifying a transfer function for mapping scalar data to opacity. With this technique, scientists and engineers have come to understand the overall distribution of volume data from various kinds of numerical simulation results and measurements.

Among volume rendering techniques presented so far there are the ray tracing method, the slice-by-slice method, and the tetrahedral projection method.

In the ray tracing method, a ray that passes each pixel is generated from a viewing point and the volume data is integrated along a viewing ray. Actually, values at several sampling points along the ray are approximated by numerical integration instead of by performing integration. There are two sampling methods. One is to sample data in equal intervals along the ray and the other is to evaluate points of intersection of ray and cell. The data to be handled is an orthogonal regular grid in the former sampling method, and the volume data to be defined on an irregular grid in the latter. The details are described in the following references. Reference (A) is related to the former sampling method and reference (B) is related to the latter.

(A) Levoy, M., "Display of Surfaces from Volume Data," *IEEE Computer Graphics & Applications*, Vol. 8, No. 3, pp. 29–37 (May 1988).

(B) Garrity, M. P., "Raytracing Irregular Volume Data," *Computer Graphics*, Vol. 24, No. 5, pp. 35–40 (Nov. 1990).

In the slice-by-slice method, color value and opacity volume are created from the volume data defined on the superlattice, and converted into a volume facing the viewing direction by the 3-D affine method, and then images are generated by composing surfaces (slices) from front to back or from back to front in order along a viewing ray using the two-dimensional (2-D) image composition method. This is the volume data defined on the superlattice. The details are disclosed in the following reference (C).

(C) Drebin, R. A., Carpenter, L., and Hanrahan, P., "Volume Rendering," *Computer Graphics*, Vol. 22, No. 4, pp. 65–74 (Aug. 1988).

The tetrahedral projection method is a method aiming at effective use of a 3-D graphics processor that handles existing triangulated primitives for the purpose of increasing the processing speed. First, the original data is divided into tetrahedral cells. Here, using the silhouette of a tetrahedral cell projected on the screen, the original tetrahedral cell is further divided into smaller tetrahedral cells so that the projected image becomes a triangle. Then, colors and opacities are evaluated at the vertices of the triangles that are the projected images of the tetrahedral cell and the results are made into images as a set of triangles having color values and opacities at the three vertices using a graphics processor. This method is described in the following reference (D).

(D) Shirley, P. and Tuchman, A., "A Polygonal Approximation to Direct Scalar Volume Rendering," *Computer Graphics*, Vol. 24, No. 5, pp. 63–70 (Nov. 1990).

However, if an attempt is made to materialize an advanced display function using the conventional volume rendering techniques mentioned above, compared to the conventional surface rendering technique, it will take enormous amount of computation time with any of these techniques under the present conditions, because of the following two reasons. The first reason is that, in volume rendering, data sampling must be carried out over a 3-D region, unlike with surface rendering. The second reason is that, in surface rendering, dedicated processors for the purpose of increasing the processing speed have been developed and many of them have been put on the market as important component elements of engineering workstations, but with volume rendering, no such processors have yet been put on the market.

Also, in conventional volume rendering, there is a restriction in that the volume data to be handled is limited to either a regular grid or an irregular grid.

An object of the present invention is to provide a method that can materialize rendering processing from volume data at high speed using a surface rendering processor.

AnOther object of the present invention is to provide a rendering method having no restrictions on the structure of volume data to be processed.

SUMMARY OF THE INVENTION

In the present invention, the sampling points of volume data over a 3-D region are, in principle, arranged on the surfaces in equal intervals along a viewing ray, and these surfaces are extracted as a set of triangles. Then, the volume data at each vertex of these triangles and the gradient vectors of this data are obtained by interpolation and generated as a triangle data group. High-speed volume rendering is materialized by displaying the data groups of these partially transparent triangles using a surface rendering processor.

Since existing programs can be used for generation and processing of triangle data groups, there are no restrictions on the structure of the volume data to be handled.

BRIEF DESCRIPTION OF THE DRAWINGS

FIG. 11 is a diagram showing a color table and an opacity table of rendering tables.

FIG. 12 is a diagram showing data that is recorded in the second triangle data memory.

DESCRIPTION OF THE PREFERRED EMBODIMENT

Figure 1:
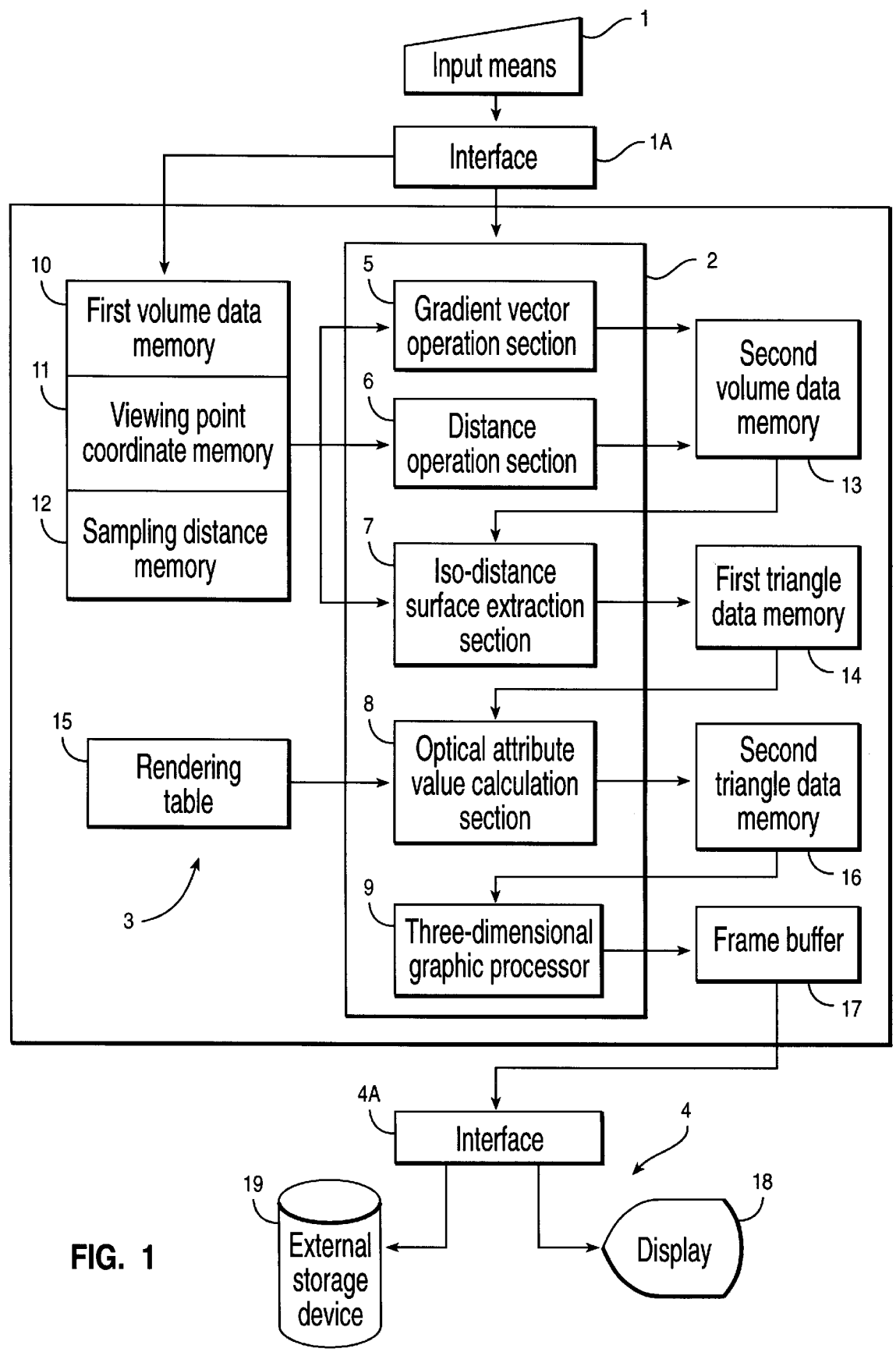
FIG. 1 is a diagram showing an image generation device to materialize volume rendering that is an embodiment of the present invention.

FIG. 1 illustrates an image generation device to materialize volume rendering which is an embodiment of the present invention. 1 is an input means that inputs volume data, processing commands, etc., and the input value is sent to an appropriate section through interface 1A. 2 is a processing section that processes volume data and outputs rendering data. 3 is a memory section, 4 is an output section, and 4A is an output interface. Processing section 2 is provided with a gradient vector operation section 5, a preprocessing section including a distance operation section 6, an isosurface generation section including an isodistance surface extraction section 7 and an optical attribute value calculation section 8, and a scan conversion section including 3-D graphic processor 9 for surface rendering.

Gradient vector operation section 5 calculates grid data from the volume data of first volume data memory 10. Grid data includes difference calculus analysis results, regular grid data that is obtained from CT scan data, etc., and irregular grid data that is obtained from finite element method analysis results, etc. Distance operation section 6 calculates the distance from the viewing point of the volume data using the data of viewing point coordinate memory 11 and the data of sampling interval memory 12. The output of the preprocessing section is recorded in second volume data memory 13.

Iso-distance surface extraction section 7 receives the preprocessed volume data from second volume data memory 13, executes the iso-distance surface extraction process, outputs the volume data values and triangle data (first) having this data and the gradient vector at each vertex of the triangles, and records this in first triangle data memory 14.

Optical attribute value calculation section 8 obtains color values corresponding to data values of first triangle data memory 14 by referring to a color table of rendering table 15, and also obtains opacities corresponding to the data values by referring to the opacity table. These results are recorded in second triangle data memory 16 as triangle data (second) having a color value and opacity at each vertex.

Surface rendering 3-D graphic processor 9 receives triangle data (second), generates a volume rendering image, and supplies this to frame buffer 17. The progress of processing and the final result are displayed on display 18 of output section 4 and the final result is recorded in external storage device 19.

Figure 2:
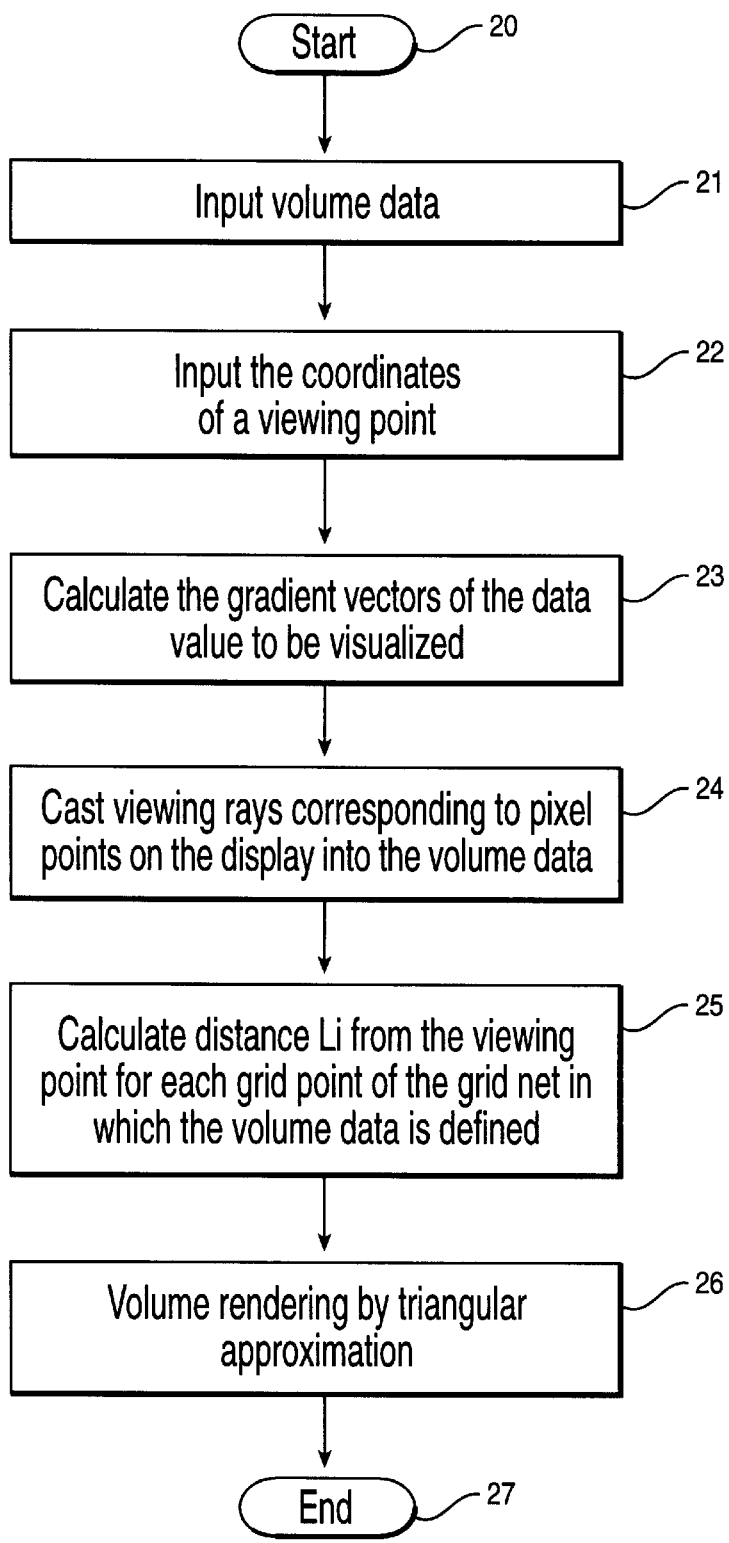
FIG. 2 is a diagram showing the procedure of volume rendering that is an embodiment of the present invention.

FIG. 2 shows an example of the procedure of volume rendering processing. First, the volume data V, viewing point coordinate, and sampling interval value that are input from input section 1 are recorded in first volume data memory 10, viewing point coordinate memory 11, and sampling interval memory 12 respectively (steps 21 and 22). Color table and opacity table data are recorded in rendering table 15.

Figure 3:
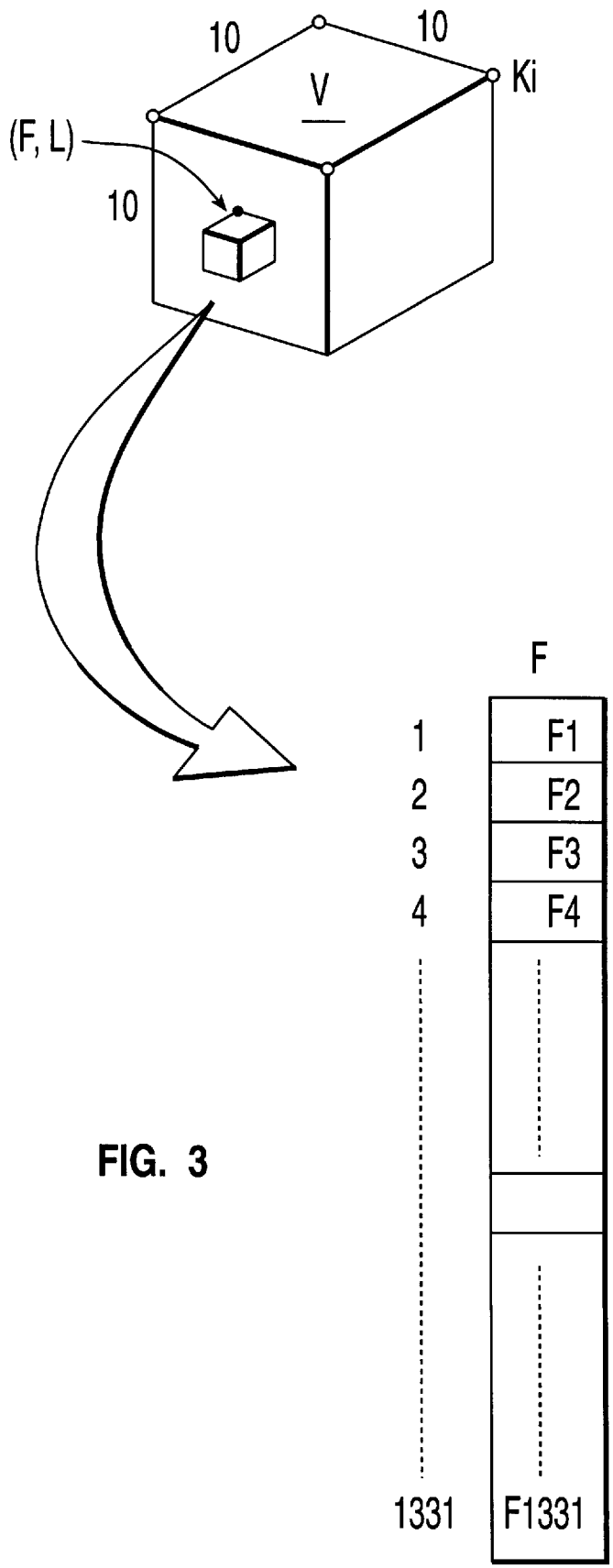
FIG. 3 is a diagram showing an example of volume data of a regular grid.
Figure 4:
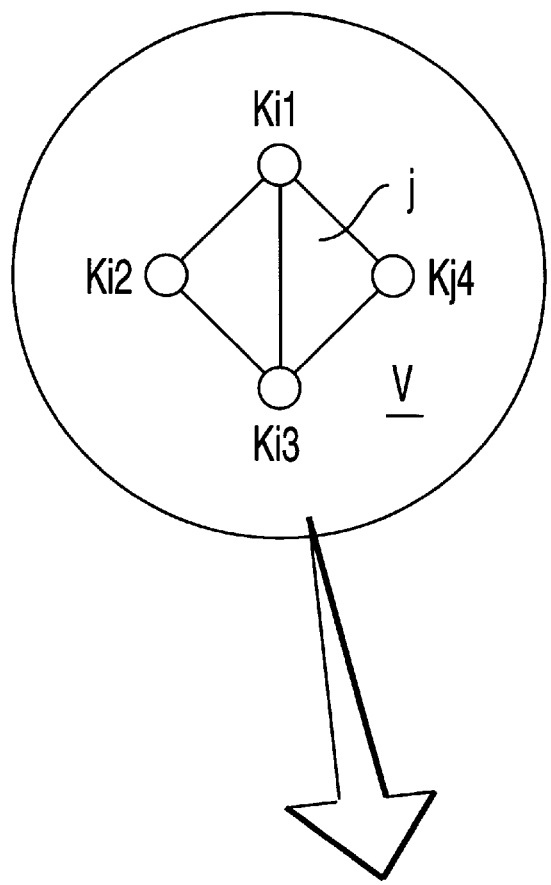
FIG. 4 is a diagram showing an example of volume data of an irregular grid.

Volume data V includes the data of each grid point $K_i$; for example, CT value, temperature in fluid analysis, numerical value F expressing a pressure value and coordinate values (X, Y, Z). In the example of the regular grid of FIG. 3, there are 1331 (11×11×11) data corresponding to grid points $K_i$. FIG. 4 shows an example of an irregular grid. Data F of each grid point $K_i$ corresponding to each surface of tetrahedron j and coordinate values (X, Y, Z) are recorded $i_n$ position in on the memory together with table TA1 that defines tetrahedron j. In the following descriptions, it is assumed that all the coordinates are converted into the viewing point coordinate system.

Figures 5, 6:
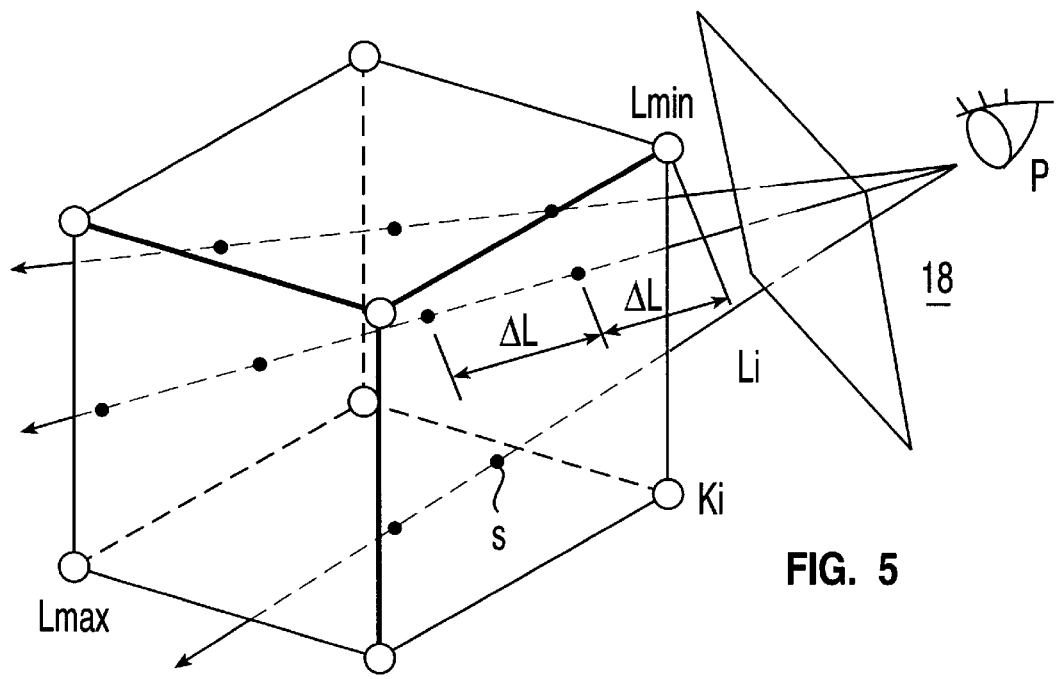
FIG. 5 is a diagram explaining sampling points of volume data and distance $L_i$.
FIG. 6 is a diagram showing an example of intermediate data.

The sampling points S (step 23) that are used to calculate the gradient vector N data in the sampling points are arranged in equal intervals (ΔL) along a viewing ray around viewing point P as shown in FIG. 5. In gradient vector operation section 5, the gradient of the isosurface of the scalar data value F at these sampling points S are calculated.

In the case of a regular grid, the gradient vector of the scalar data F is calculated by taking the differences in each direction of X, Y, and Z at the sampling points S, and in the case of an irregular grid, it is calculated by utilizing the interpolation function of each grid. This gradient vector is essential for executing volume rendering. Detailed explanation of its calculation method is omitted here because it is reported in the above-identified paper relating to volume rendering.

Next viewing rays corresponding to the pixel points on display 18 are cast into the volume data V that was received from first volume data memory 10 as shown in FIG. 5 and then the distance $L_i$ from the viewing point P $(X_e, Y_e, Z_e)$ is obtained for each grid point $K_i$ (steps 24 and 25).

That is, in distance operation section 6, distance $L_i$ from the viewing point is calculated based on the following equation. Volume data (F, X, Y, Z), data value gradient vector N, and distance data $L_i$ such as shown in FIG. 6 are generated as intermediate data.

distance $L = L_{min} + K\Delta L$ where, $(\Delta L = (L_{max} - L_{min})/(N+1)$, N: sampling number, K: 1–N)

In the case of perspective projection (FIG. 5): The distance $L_i$ at grid point $K_i$ $(X_i, Y_i, Z_i)$ can be obtained as follows.

When $Z_i > 0$, $L_i = ((X_i - X_e)^2 + (Y_i - Y_e)^2 + (Z_i - Z_e)^2)^{1/2}$

When $Z_i \leq 0$, $L_i = -((X_i - X_e)^2 + (Y_i - Y_e)^2 + (Z_i - Z_e)^2)^{1/2}$ Also, the maximum value $L_{max}$ and the minimum value $L_{min}$ of distance $L_i$ with $Z_i > 0$ are calculated.

In the case of parallel projection (FIG. 7): The distance $L_i$ at grid point $K_i$ $(X_i, Y_i, Z_i)$ can be obtained as follows.

$L_i = Z_i$

Also the maximum value $L_{max}$ and the minimum value $L_{min}$ of distance $L_i$ with $Z_i > 0$ are calculated.

Figure 8:
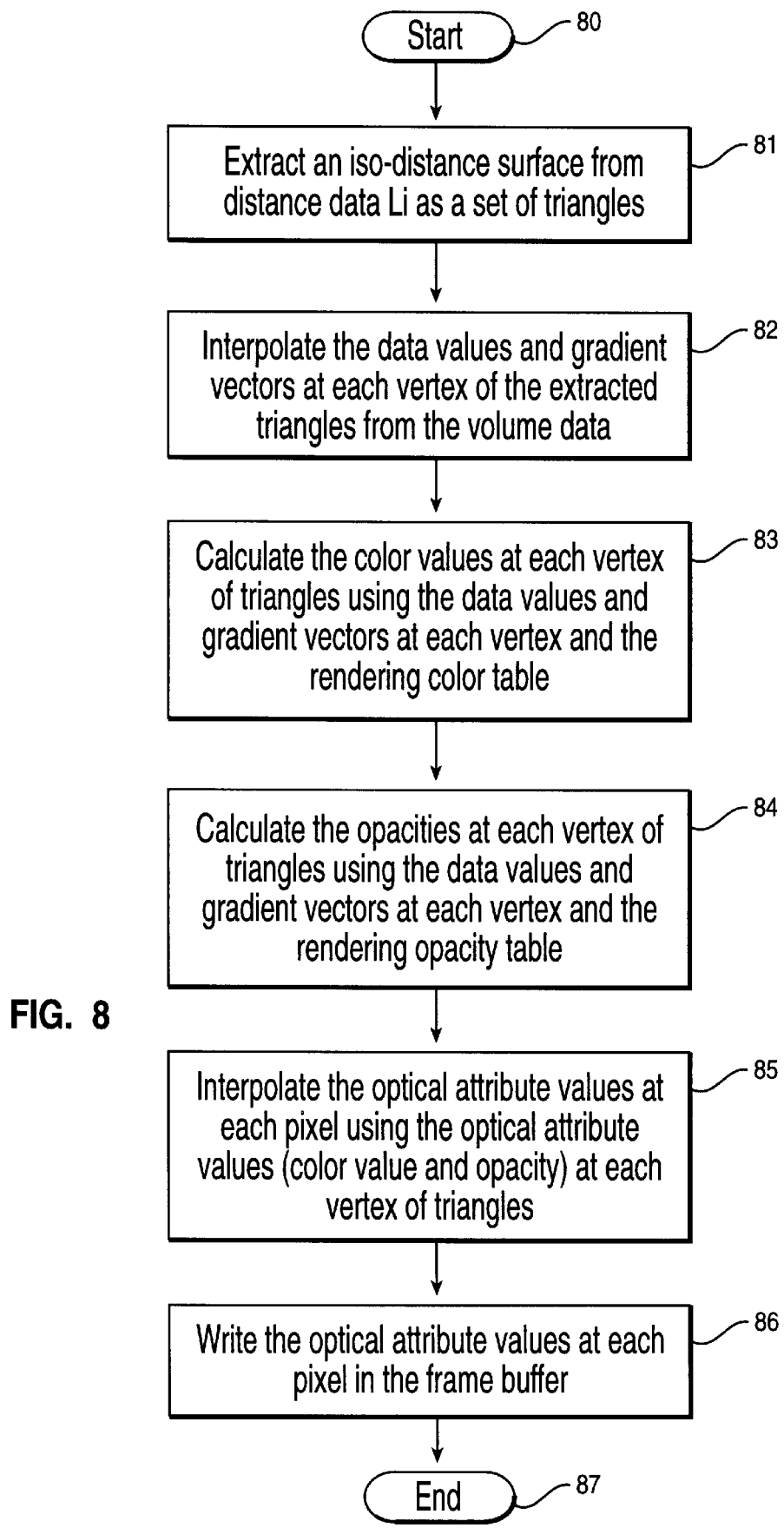
FIG. 8 is a diagram showing the details of volume rendering by triangular approximation that is an embodiment of the present invention.

Next, volume rendering by triangular approximation is carried out (step 26). FIG. 8 shows the details of this step 26. Iso-distance surfaces are extracted by iso-distance surface extraction section 7 (step 81).

In general, when the distribution of scalar data F is given as F (X, Y, Z), the iso-distance surface is defined as a set of points having appropriate scalar value C, iso-distance surface (X, Y, Z)={F(X, Y, Z)=C}. In the iso-distance surface extraction algorithm, this iso-distance surface is extracted as a set of plane triangles from grid data.

Figure 9:
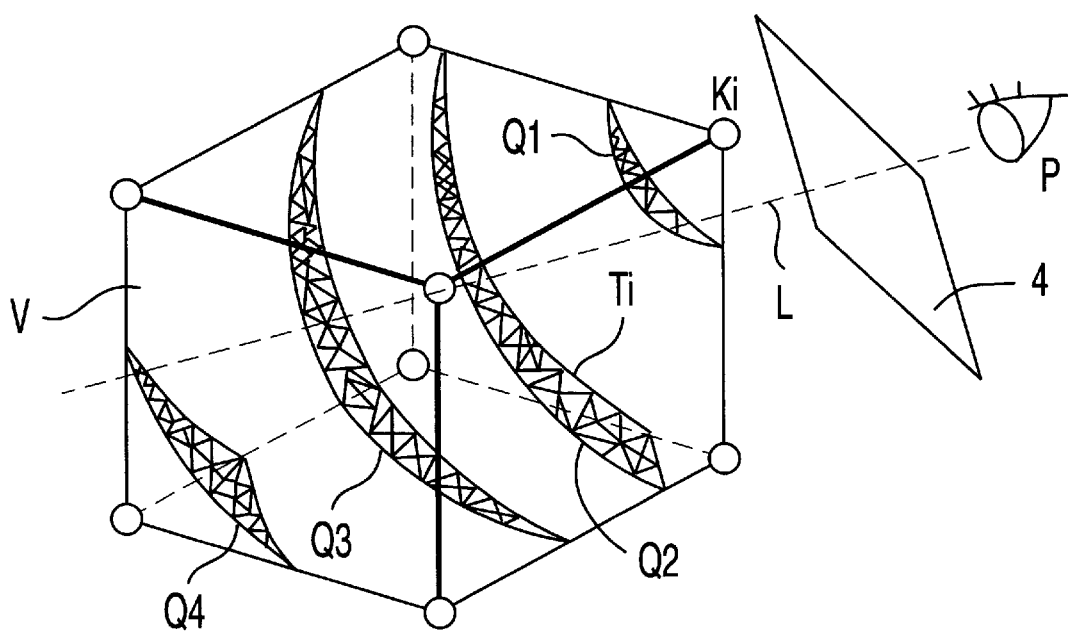
FIG. 9 is a diagram showing concentric spherical surfaces by sets of sampling points S in the case of perspective projection.

In the present invention, this iso-distance surface extraction algorithm is applied to the distance data ($L_i$), not to the data value (F) to be visualized. That is, the distance between the maximum value and the minimum value is divided into appropriate intervals and then the iso-distance surface for each distance is extracted as a set of triangles $T_i$. Triangles are generated using the points of intersection of the grid net in which the volume data is defined and iso-distance surfaces (by subdividing into small segments so that they become triangles, if necessary). Sampling points S are arranged in equal intervals along a viewing ray as mentioned above in principle. Therefore, in the case of perspective projection, a set of these points forms concentric spherical surfaces $Q_1, Q_2, \ldots Q_n$ around viewing point P, as shown in FIG. 9.

Figure 7:
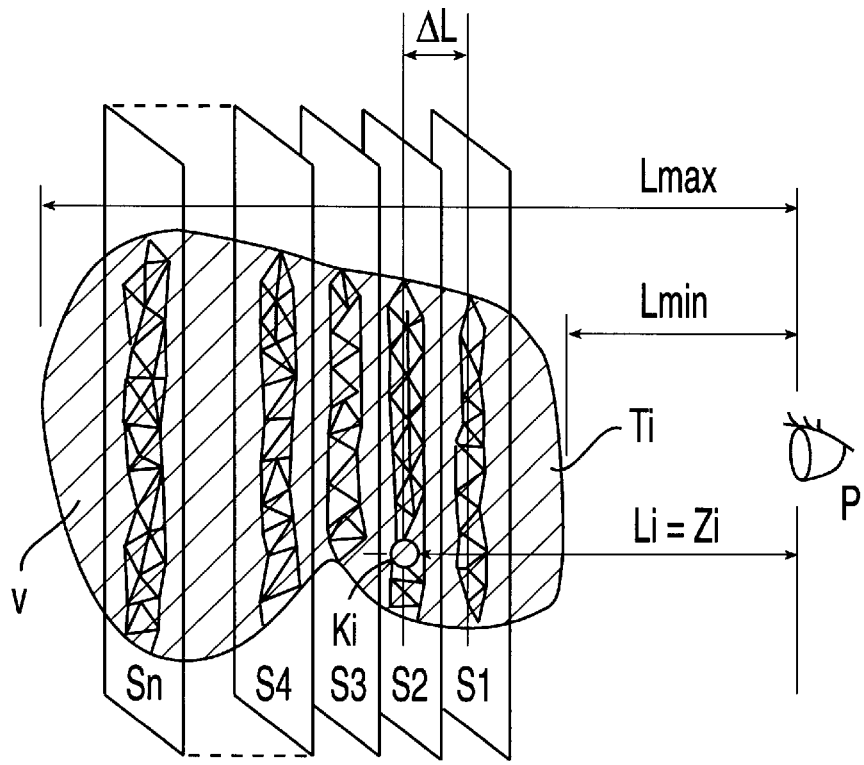
FIG. 7 is a diagram explaining sampling points and distance $L_i$ in the case of parallel projection.

In the case of parallel projection, a set of these points forms planes $S_1, S_2, \ldots S_n$ that are perpendicular to a viewing ray, as shown in FIG. 7. In this case, a volume slice algorithm can be applied. In the volume slice algorithm, planes are extracted from grid data V as a set of triangles $T_i$.

Figure 10:
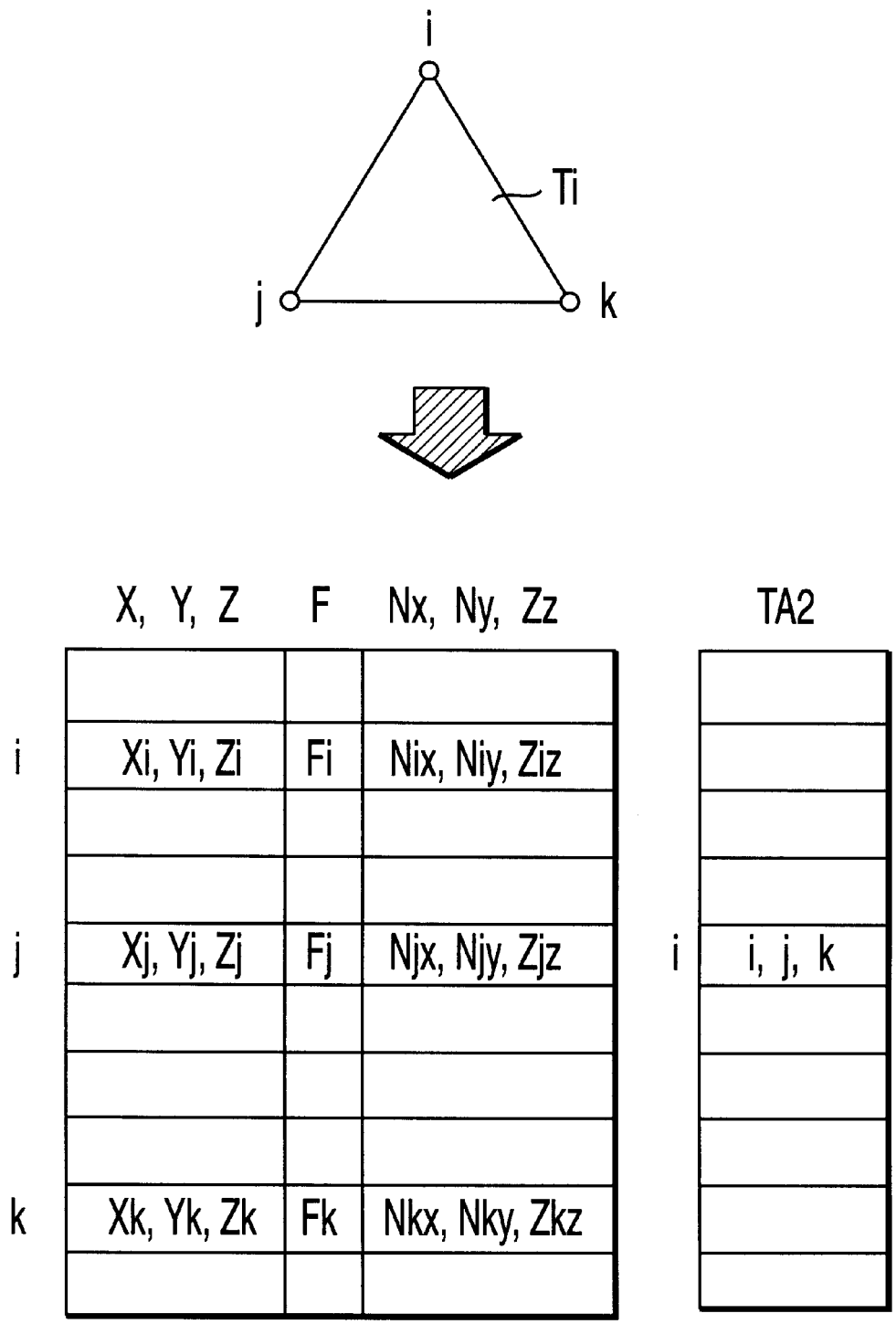
FIG. 10 is a diagram showing data that is recorded in the first triangle data memory.

Next, volume data values (X, Y, Z, F) are interpolated at each vertex (i, j, k) of the extracted triangle and the gradient vector ($N_x, N_y, N_z$) of this data value using volume data (step 82). The triangle data (first) obtained in this way is recorded in first memory for triangle data 14 together with table TA2 that shows coordinate 1 of each vertex (i, j, k) of a triangle, as shown in FIG. 10.

Furthermore, the optical attribute values (color value, opacity) at each vertex of a triangle are calculated from this triangle data (first) by using an optical model (steps 83 and 84). That is, in optical attribute value calculation section 8, color values (R, G, B) and opacities (^N⁰o^O are calculated from first triangle data memory 14 and rendering table 15 data by using an optical model. This calculation is processed as follows. First, pseudo-color values (r, g, b) are obtained for each vertex from data value F by using a color table having characteristics, an example of which is shown in FIG. 11 (A), and then color values (R, G, B) are calculated using the shading function by taking the gradient vector as a normal vector of virtual surface at that position. Also, the opacity ($\alpha$) corresponding to data value F is obtained for each vertex by using a rendering opacity table having characteristics, an example of which is shown in FIG. 11 (B). Then the color value $C_i$ (R, G, B) and opacity ($\alpha$) data that were calculated at each sampling point S are recorded in second triangle data memory 16 as the triangle data (second) shown in FIG. 12. Color value $C_i$ is obtained by the following equation.

$$C_i = KA + KD(N \cdot L) + KS(R \cdot E)^n$$

Where, L is the light source vector, N is the normal vector of the surface, R is the reflection vector, E is the viewing ray vector, and KA, KD, KS, and n are constants.

Figure 13A:
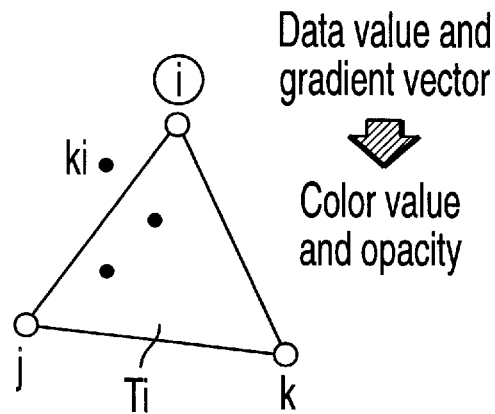
FIG. 13 is a diagram showing a method to obtain the color value and opacity at each pixel point $PC_i$ by scan conversion.
Figure 13B:
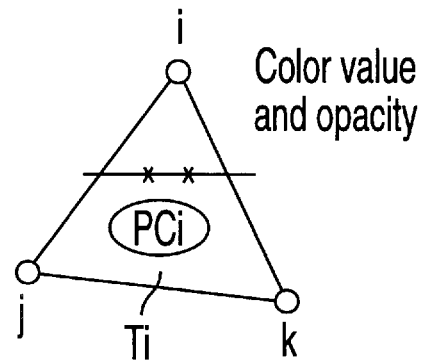
Figure 14:
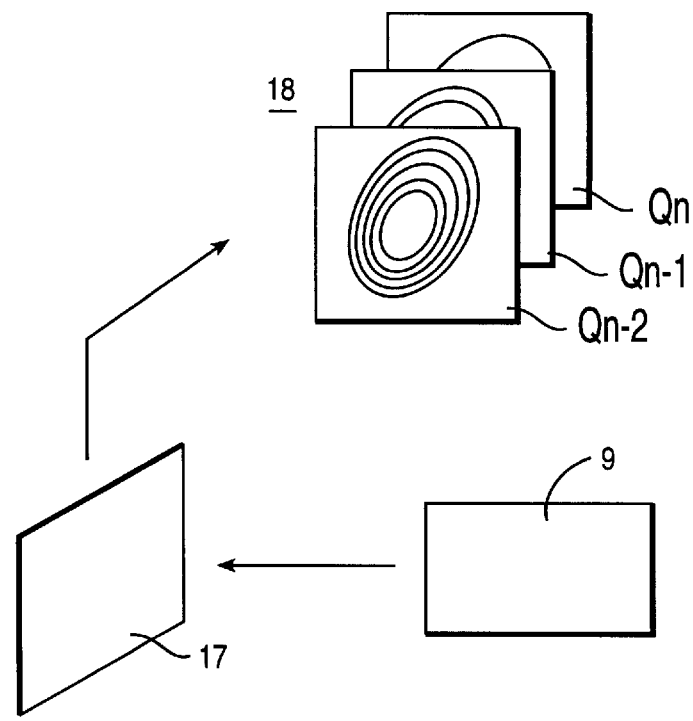
FIG. 14 is a diagram showing the conditions to display the scan conversion result on the display screen by writing it in the frame buffer.

Next, triangle $T_i$ having the optical attribute values (R) at each vertex i, j, and k that were extracted at distance $L_i$ from the viewing point is scan-converted by 3-D graphic processor 9, as shown in FIG. 13, and then color values ($R_{pi}, G_{pi}, B_{pi}$) and opacities ($\alpha_{pi}$) at each pixel point $PC_i$ are obtained from the optical attribute values at each vertex of the triangle by linear interpolation (step 85). These interpolated color values ($R_{pi}, G_{pi}, B_{pi}$) are written in frame buffer 17 from back to front in order using the opacities ($\alpha_{pi}$) (step 86). That is, partially transparent triangles are displayed by adding color values ($R_{pi}, G_{pi}, B_{pi}$) in the manner of displaying partially transparent polygons. Writing on surfaces is to be executed from back to front in order. On a surface, the triangles in it can be written in any order because they do not overlap with each other with regard to the viewing point. In this way, when the results of the rendering process are written in frame buffer 17 one after another, the progress of the rendering process is displayed on display screen 18 part by part from back to front in order (FIG. 14).

If the color values that are written in pixels in advance are ($R_{old}, G_{old}, B_{old}$), the color values ($R_{pinew}, G_{pinew}, B_{pinew}$) after the end of the writing will be calculated as:

$$(R_{pinew}, G_{pinew}, B_{pinew}) = (1-\alpha_{pi})(R_{piold}, G_{piold}, B_{piold}) + \alpha_{pi}(R_{pi}, G_{pi}, B_{pi})$$

Here, $\alpha_{pi}$ is the opacity that was interpolated at a pixel point. The initial value of the pixel color is to be ($R_{pi}, G_{pi}, B_{pi}$) = (0, 0, 0).

In the normal volume rendering algorithm, data values and gradient vectors must be interpolated for the total number of pixels on each spherical surface or plane, while in the present invention they are interpolated only at vertices of the triangles on each surface. In general, the number of pixels is much greater than the number of vertices of triangles, and a surface rendering dedicated processor is used for the interpolation of the color values and opacity at each pixel in the present invention, so that overall calculation effectiveness is improved considerably.

There might be opacity differences for the data values because the color value and opacity at each pixel point in the scan conversion stage are obtained by linear interpolation. Some of the generated images will not be even in quality, but it will be sufficient for use in grasping the overall situation of data distribution in a short time.

Figure 15:
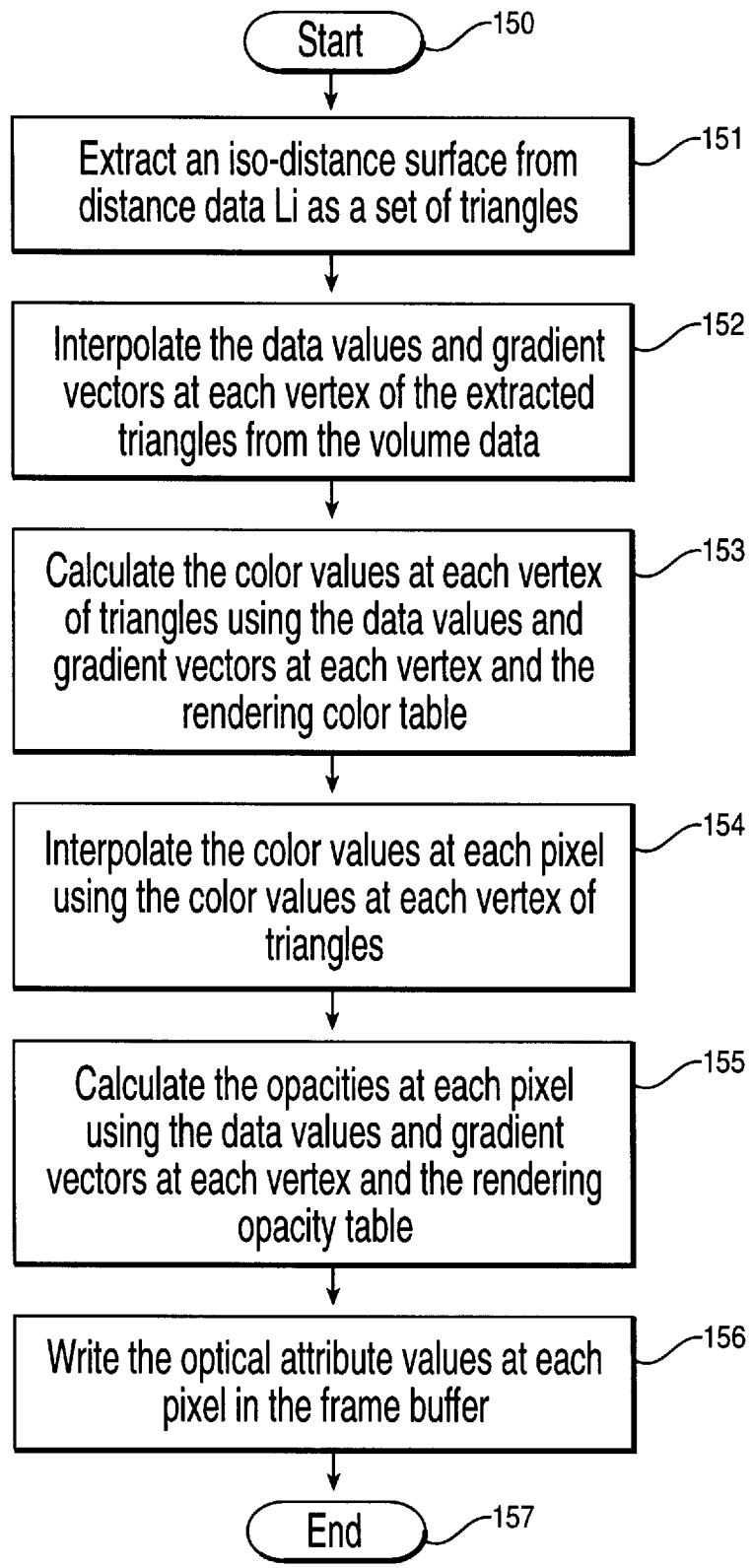
FIG. 15 is a diagram showing another embodiment of volume rendering by triangular approximation.
Figures 16A, 16B:
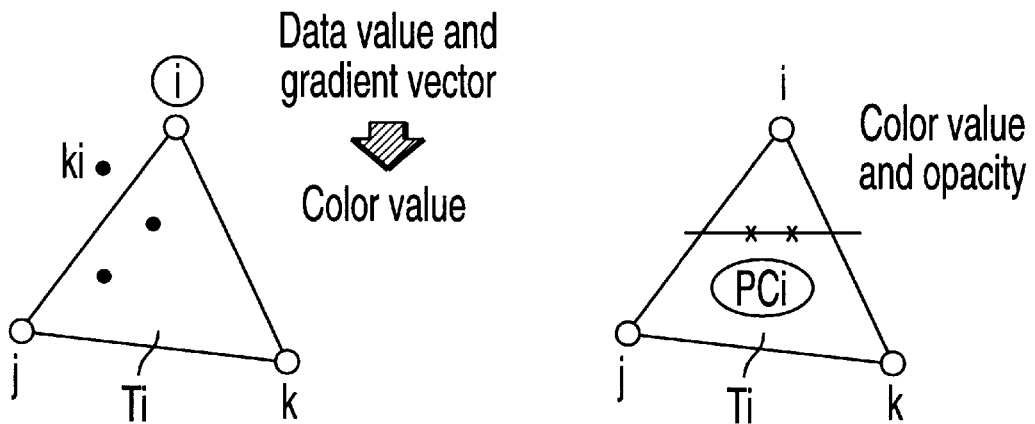
FIG. 16 is a diagram showing an example of scan conversion by the method in FIG. 15.

FIGS. 15 and 16 show another embodiment of volume rendering by triangular approximation of the present invention. In this example, the color values ($R_{pi}, G_{pi}, B_{pi}$) at a pixel point are obtained from the color table and triangular data (first) by linear interpolation (steps 153 and 154). The conversion into opacity $\alpha_{pi}$ is executed in the scan conversion stage using the rendering opacity table and triangle data (first) (step 155). That is, in optical attribute value calculation section 8, first the color values (R, G, B) at vertices i, j, and k are calculated from the triangle data (first) and the color table data of rendering table 15 and then recorded in second triangle data memory 16. Next, opacity ($\alpha_{pi}$) is interpolated in the scan conversion stage using the triangle data (first) and the rendering opacity table. The color values ($R_{pi}, G_{pi}, B_{pi}$) at a pixel point are obtained by linear interpolation using the second triangle data memory data. The use of this method is more accurate in opacity calculation and the generated images are more even in quality than the embodiment mentioned above. However, the color displayed might be a little different compared to the actual data because linear interpolation is executed using triangle data (second) for the color values.

Figures 18A, 18B:
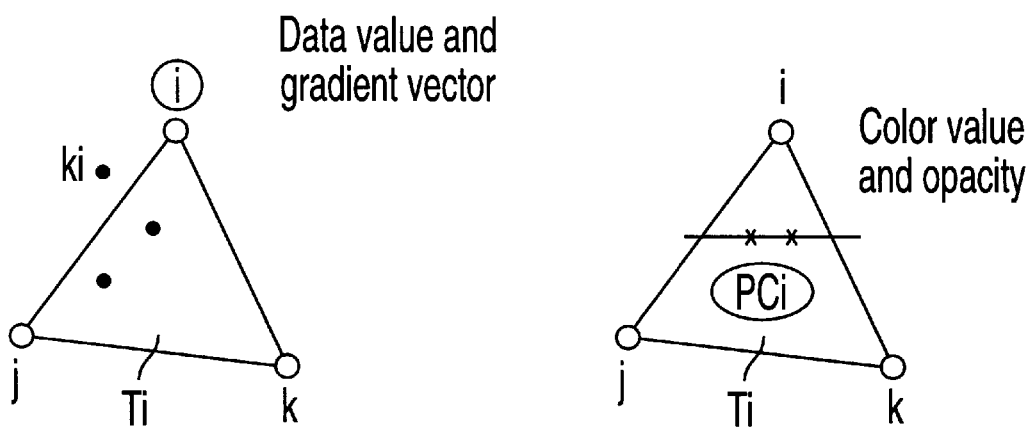
FIG. 18 is a diagram showing an example of scan conversion by the method in FIG. 17.
Figure 17:
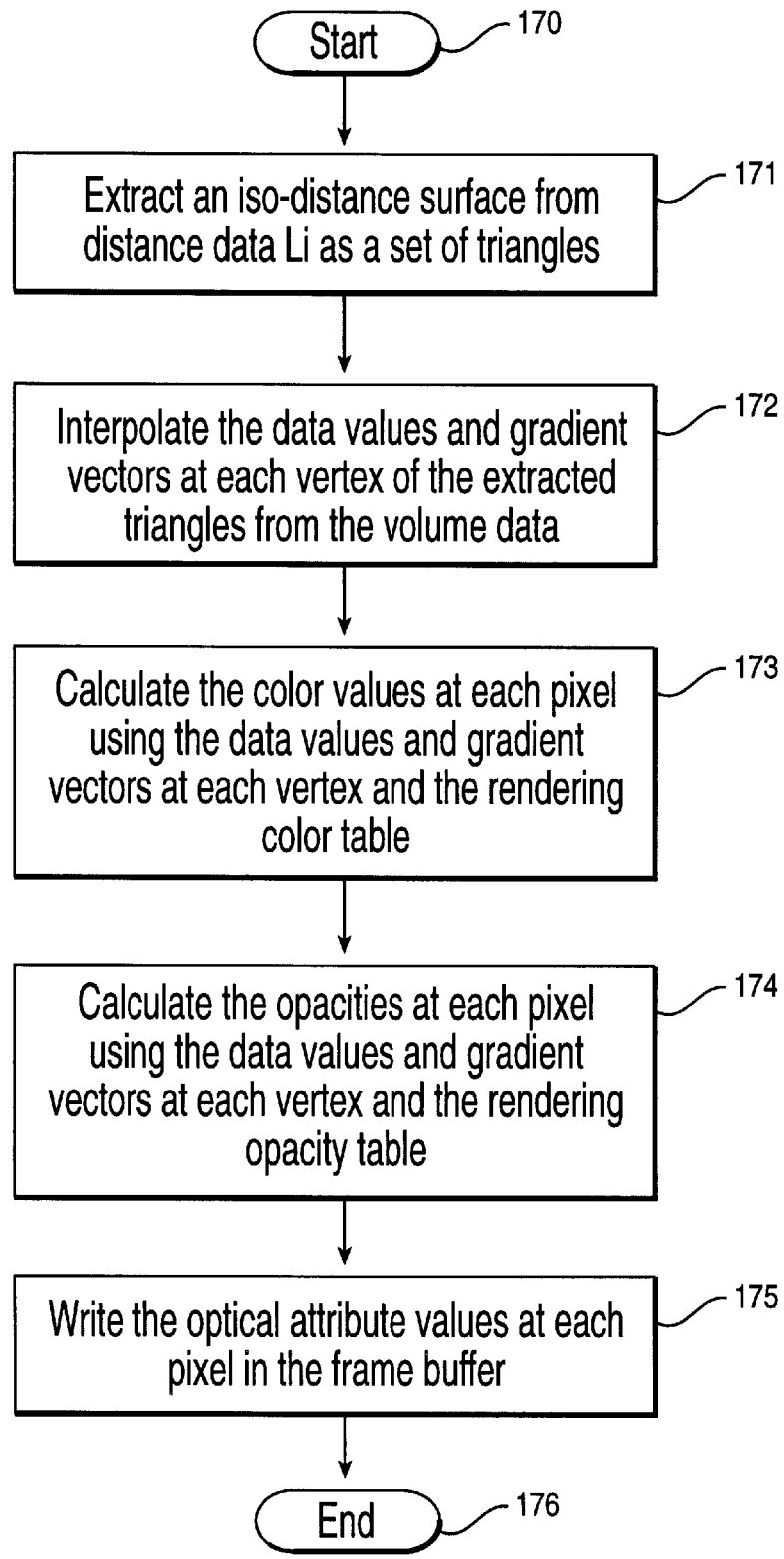
FIG. 17 is a diagram showing another embodiment of volume rendering by triangular approximation.

Furthermore, the conversion of data value and gradient vector at pixel point $PC_i$ into color values can be executed in the scan conversion stage, as shown in FIG. 17 (steps 173 and 174) and FIG. 18. That is, in optical attribute value calculation section 8, the color values ($R_{pi}$, $G_{pi}$, $B_{pi}$) at a pixel point are interpolated in the scan conversion stage using the triangle data (first) and the color table data of rendering table 15, and opacity ($\alpha$) is also interpolated using the triangle data (first) and the rendering opacity table as well. Therefore, the second triangle data memory becomes unnecessary. The use of this method is more accurate in color value and opacity calculation and the generated images are more even in quality. The data is reflected accurately, but the time required for the calculation using this method becomes a little longer.

Figures 19A, 19B:
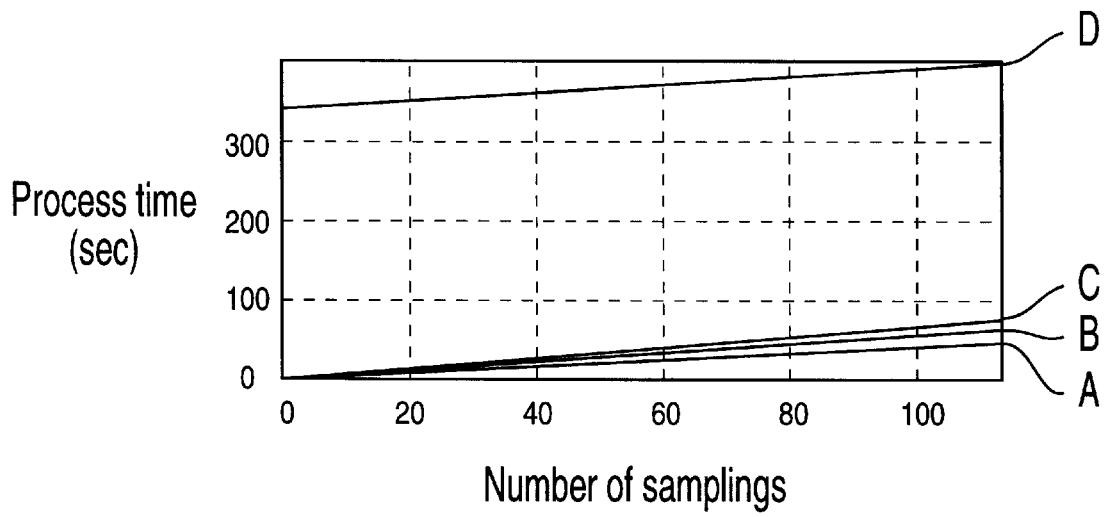
FIG. 19 is a diagram showing a comparison of the results processed by the method of the present invention and by the conventional method.

FIG. 19 shows a comparison of the results by the methods mentioned above. A, B, and C show the conditions of process time (a) and image quality (b) by the method in FIG. 8, by the method in FIG. 15, and by the method in FIG. 17 of the present invention respectively. D shows the conditions of those by the conventional ray tracing method. It can be seen that the use of the method of the present invention shortens the processing time by a great deal compared to the conventional ray tracing method and enables attainment of appropriate image quality. In the methods of the present invention, there are slight differences in the process time and image quality. Therefore, it is desirable that these methods are used appropriately according to the use. For example, it is advisable to use method A to readily grasp general conditions, and method C when accurate display is required.

According to each embodiment of the present invention, it is possible to increase the speed because existing 3-D graphics processors that process polygonal primitives can be used.

Besides, there are no restrictions on the structure of the volume data to be processed because existing iso-distance surface extraction programs and volume slice programs can be used.

Since triangles are processed in which triangular prisms or truncated triangular pyramids lined on a concentric spherical surface around a viewing point are projected, the linear interpolation of opacities in the triangles is more accurate compared to the tetrahedron projection method.

Besides, modification of opacities according to the sampling length is not fundamentally required, because sampling is executed in equal intervals.

Furthermore, the sampling interval can be changed according to the level of demand for the quality and the calculation time of the images to be generated.

Since the images that are being generated can be displayed, it is suitable for use in constructing an interactive visualization tool.

In the present invention, interpolation of data values and gradient vectors is required only at vertices of triangles on a surface. The frequency of interpolation from these values to color values and opacities will also be the same as this. In general, since the number of pixels is much greater than the number of vertices of triangles, and since a surface rendering dedicated processor can be used for this interpolation, the overall calculation effectiveness is increased considerably.

Besides this, there are no restrictions on the structure of volume data to be processed.

What is claimed is:

1. A method of volume rendering comprising the steps of:
   extracting a group of concentric spherical slicing isosurfaces containing sampling points positioned in equal intervals along a viewing ray originating from a viewing point, said extracting of said group of concentric spherical slicing isosurfaces is performed by mapping input volume data onto said concentric spherical slicing isosurfaces, wherein said concentric spherical slicing isosurfaces are each extracted as a set of polygons;
   generating polygon data having data values at vertices of said polygons; and
   executing volume rendering by displaying said polygon data in a form of partially transparent polygons.

2. A method as in claim 1 in which said polygons are triangles.

3. A method as in claim 1 in which said polygon data includes gradient vectors of the data at the vertices of said polygons.

4. A method as in claim 1 in which said polygons are generated by subdivision so that they become triangles by using points of intersection of a grid net in which said volume data is defined and a surface containing said sampling points.

5. A method as in claim 1 in which said polygons are such that a group of planes perpendicular to a viewing ray are extracted from said volume data as a set of polygons.

6. Volume rendering apparatus comprising:
   means for extracting a group of concentric spherical slicing isosurfaces containing sampling points positioned in equal intervals along a viewing ray originating from a viewing point, said extracting of said group of concentric spherical slicing isosurfaces is performed by mapping input volume data onto said concentric spherical slicing isosurfaces, wherein said concentric spherical slicing isosurfaces are each extracted as a set of polygons;
   means for generating polygon data having data values at vertices of said polygons; and
   means for executing volume rendering by displaying said polygon data in a form of partially transparent polygons.

7. Apparatus as in claim 6 in which said polygons are triangles.

8. Apparatus as in claim 6 in which said polygon data includes gradient vectors of the data at the vertices of said polygons.

9. In a device for volume rendering having an input means for inputting volume data, a memory section for storing said volume data, a processing section for processing said volume data to generate rendering data, and an output means for outputting said rendering data to a display, a method of volume rendering comprising the steps of:
   casting a viewing ray corresponding to a pixel point on the display for output into volume data;
   extracting a group of concentric spherical slicing isosurfaces containing sampling points arranged in equal intervals along this viewing ray around a viewing point, wherein said concentric spherical slicing isosurfaces are arranged along said equal intervals, and wherein said viewing point lies outside of said volume data;
   interpolating a normal vector of an iso-distance surface of one of said concentric spherical slicing isosurfaces related to a volume data value and a data value at said sampling points;
   calculating color values (R, G, B) and opacities ($\alpha$) by using these data values, gradient vectors, and optical models that were given in advance; and
   performing a partially transparent display by using said color values and opacities.

10. A method as in claim 9 in which said sampling points are a group of planes perpendicular to a viewing ray.

11. A method as in claim 10 in which said rendering data is defined for pixel points on a display, said method comprising the steps of:
   obtaining the volume data value and its gradient vector at the vertices of said polygons from said volume data by interpolation and obtaining the color values and opacities at pixel points on the display according to interpolated values at a time of scan conversion.

12. An image generation device having an input means for inputting volume data, a memory section for storing said volume data, a processing section for processing said volume data to generate rendering data, and an output means for outputting said rendering data to an external device, said processing section comprising:

a preprocessing section that preprocesses said volume data by calculating a gradient vector and a distance from a viewing point for each of said volume data by using the input volume data and viewing point coordinate data;

an iso-distance surface extraction section that receives the preprocessed volume data, carries out an iso-distance surface extraction process, and outputs polygon data having a volume data value and the gradient vector of the volume data at polygon vertices;

an optical attribute value calculation section that obtains color values and opacities corresponding to said polygon data by referring to a rendering table; and a surface rendering graphic processor that receives output from said optical attribute value calculation section, generates a volume rendering image, and supplies this to a frame buffer, wherein said preprocessing section further comprises:

a gradient vector operation section that calculates a gradient vector by using the input volume data and a distance operation section that calculates the distance from said viewing point by using the input volume data, viewing point coordinate data, and sampling interval data;

wherein said distance operation section extracts a group of concentric spherical slicing isosurfaces around said viewing point as sampling points and said iso-distance surface extraction section generates a group of said polygon data on said concentric spherical slicing isosurfaces.

13. Apparatus as in claim 12 in which said rendering data is defined for pixel points on said display, said optical attribute value calculation section obtaining the volume data values and the gradient vectors of the volume data at the vertices of said polygons from said volume data by interpolation and obtaining the color values and opacities at pixel points on the display according to interpolated values at a time of scan conversion.

14. Apparatus as in claim 12 in which said rendering data is defined for pixel points on said display, said optical attribute value calculation section obtaining the volume data values and the gradient vectors of the volume data at the vertices of said polygons from said volume data by interpolation, obtaining the color values at pixel points on the display according to the interpolated values, and obtaining the opacities at pixel points on the display according to interpolated values at a time of scan conversion.

* * * * *